United States Patent
Kung et al.

(10) Patent No.: US 10,326,361 B2
(45) Date of Patent: Jun. 18, 2019

(54) ASYNCHRONOUS LOW DROPOUT REGULATOR

(71) Applicant: MediaTek Inc., Hsin-Chu (TW)

(72) Inventors: Nien-Hui Kung, San Jose, CA (US); Chia-Hua Chou, Hsinchu (TW); Yen-Hsun Hsu, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/907,225

(22) Filed: Feb. 27, 2018

(65) Prior Publication Data

US 2018/0262105 A1   Sep. 13, 2018

Related U.S. Application Data (60) Provisional application No. 62/468,425, filed on Mar. 8, 2017, provisional application No. 62/468,427, filed on Mar. 8, 2017.

(51) Int. Cl.
| | |
|---|---|
| *G05F 3/02* | (2006.01) |
| *H02M 3/156* | (2006.01) |
| *G05F 1/56* | (2006.01) |
| *G05F 1/59* | (2006.01) |
| *G05F 1/575* | (2006.01) |

(52) U.S. Cl.
CPC ............. *H02M 3/156* (2013.01); *G05F 1/56* (2013.01); *G05F 1/575* (2013.01); *G05F 1/59* (2013.01)

(58) Field of Classification Search
CPC ... G05F 1/56; G05F 1/00; G05F 1/565; Y10T 307/406
USPC .................. 323/269–276; 327/142, 143, 541
See application file for complete search history.

(56) References Cited

U.S. PATENT DOCUMENTS

| | | | |
|---|---|---|---|
| 7,400,123 B1 | 7/2008 | Voogel | |
| 7,676,239 B1* | 3/2010 | Doyle | H04W 52/52 455/114.3 |
| 8,098,505 B1* | 1/2012 | Choi | H02M 1/4225 323/272 |
| 8,912,775 B2* | 12/2014 | Feldtkeller | H02M 1/4225 323/207 |
| 9,046,910 B2* | 6/2015 | Sako | G05F 1/561 |
| 9,577,513 B2* | 2/2017 | Feldtkeller | H02M 1/4225 |

(Continued)

OTHER PUBLICATIONS

Nasir et al., Modeling and Analysis of System Stability in a Distributed Power Delivery Network with Embedded Digital Linear Regulators. IEEE, 15th Int'l Symposium on Quality Electronic Design. 2014;68-75.

(Continued)

*Primary Examiner* — Rajnikant B Patel
(74) *Attorney, Agent, or Firm* — Wolf, Greenfield & Sacks, P.C.

(57) ABSTRACT

A low dropout regulator that produces an output includes a comparison circuit, configured to compare a signal representative of the output and a reference signal to produce a comparison result. The low dropout regulator also includes a loop controller, coupled to the comparison circuit, configured to generate an output circuit control signal based at least in part on the comparison result. The low dropout regulator also includes an output circuit, comprising two or more output stages, configured to adjust a number of active output stages of the two or more output stages based on the output circuit control signal.

20 Claims, 8 Drawing Sheets

(56) References Cited

U.S. PATENT DOCUMENTS

| | | |
|---|---|---|
| 10,164,521 B2 * | 12/2018 | Castelli .................. H02M 1/42 |
| 2014/0167813 A1 | 6/2014 | Raychowdhury et al. |
| 2014/0277812 A1 * | 9/2014 | Shih ....................... G05F 1/563 |
| | | 700/298 |

OTHER PUBLICATIONS

Extended European Search Report dated Aug. 1, 2018 in connection with Application No. 18160329.1.

* cited by examiner

ASYNCHRONOUS LOW DROPOUT REGULATOR

CROSS-REFERENCE TO RELATED APPLICATIONS

This application claims priority to U.S. provisional application Ser. No. 62/468,425 filed Mar. 8, 2017, titled "FULLY ASYN, ILDO ARCHITECTURE AND CONTROL METHOD" and U.S. provisional application Ser. No. 62/468,427 filed Mar. 8, 2017 titled "MULTI ILDO ARCHITECTURE AND CONTROL METHOD" each of which is hereby incorporated by reference in its entirety.

BACKGROUND

1. Technical Field

The techniques described herein relate generally to low dropout regulators.

2. Discussion of the Related Art

Low dropout regulators are used in integrated circuits as a way to regulate an output voltage. Low dropout regulators are often designed to produce a regulated output voltage even in conditions where the output voltage approaches the supply voltage.

SUMMARY

Some embodiments relate to a low dropout regulator that produces an output, comprising: a comparison circuit, configured to compare a signal representative of the output and a reference signal to produce a comparison result; a loop controller, coupled to the comparison circuit, configured to generate an output circuit control signal based at least in part on the comparison result; and an output circuit, comprising two or more output stages, configured to adjust a number of active output stages of the two or more output stages based on the output circuit control signal.

The comparison circuit may be coupled to the loop controller through a pulse generator and the pulse generator may be configured to generate a pulse in response to a change in the comparison result.

The loop controller may be configured to generate the output circuit control signal based on the pulse.

The low dropout regulator may further comprise two or more buffer amplifiers, coupled between the loop controller and the output circuit.

The pulse generator may be configured to generate a first type of pulse if the output is greater than the reference signal.

The pulse generator may be configured to generate a second type of pulse if the output is less than the reference signal.

The loop controller may be configured to enable at least one output stage of the two or more output stages when the output is less than the reference signal.

The loop controller may be configured to disable at least one output stage of the two or more output stages when the output is greater than the reference signal.

The low dropout regulator may further comprise a timer check circuit, configured to compare a running time to a first reference time to produce a time check signal.

The loop controller may be further configured to generate the output circuit control signal based on the time check signal.

The time check signal may be generated when the running time exceeds the first reference time.

The running time may begin when the output circuit adjusts the number of active output stages.

The running time may being when a previous comparison result changed state.

The low dropout regulator may further comprise a second comparison circuit, configured to compare a signal representative of the output and a second reference signal to produce a second comparison result.

The loop controller may be further coupled to the second comparison circuit and configured to generate the output circuit control signal based at least in part on the comparison result and the second comparison result.

The low dropout regulator of claim may further comprise a second pulse generator, coupled between the second comparison circuit and the pulse generator, configured to generate a second pulse in response to a change in the second comparison result.

Some embodiments relate to a system, comprising: a load circuit comprising a plurality of sub-circuits; a first low dropout regulator coupled to a first terminal of the load circuit, configured to provide a first output of the first low dropout regulator to the first terminal; and a second low dropout regulator coupled to a second terminal of the load circuit, configured to provide a second output of the second low dropout regulator to the second terminal, wherein the first low dropout regulator is configured to send a first indication of a change of level of the first output to the second low dropout regulator.

The second low dropout regulator may be configured to provide the second output based on the first indication.

The second low dropout regulator may be configured to send a second indication of a change of level of the second output voltage to the first low dropout regulator.

The first low dropout regulator may be configured to provide the first output based on the second indication.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

An integrated low dropout (ILDO) regulator may be an important part of many integrated circuit solutions. ILDO regulators ideally provide an controllable output voltage level that can approach the supply voltage level while maintaining low fluctuation and noise. ILDO regulators may adjust their output in response to a change in the load circuit impedance, such that a constant or near-constant power, voltage, or current is provided at the output. However, typical ILDO regulators require advanced notice of change in loading conditions, indicating that the load impedance will change at a specific point in time, to provide suitable output regulation. Such ILDO regulators with advanced notification systems may not provide sufficient control when the load circuit needs a rapid adjustment in supplied current, voltage, or power from the ILDO regulator. Additionally, if the advanced notification signal is missed or delayed, the ILDO regulator may not provide the correct output voltage, current, or power level and the load circuit may receive an insufficient voltage, current, or power level, or one that is too high. Typical ILDO regulators often are synchronized to a clock cycle, which may introduce unnecessary delays in changing the supplied output voltage or current as the ILDO regulator may have to wait for a clock edge before adjusting its output voltage, current, or power level. Described herein is an ILDO regulator with an asynchronous control system capable of rapidly adjusting to changes in load circuit impedance.

Figure 1:
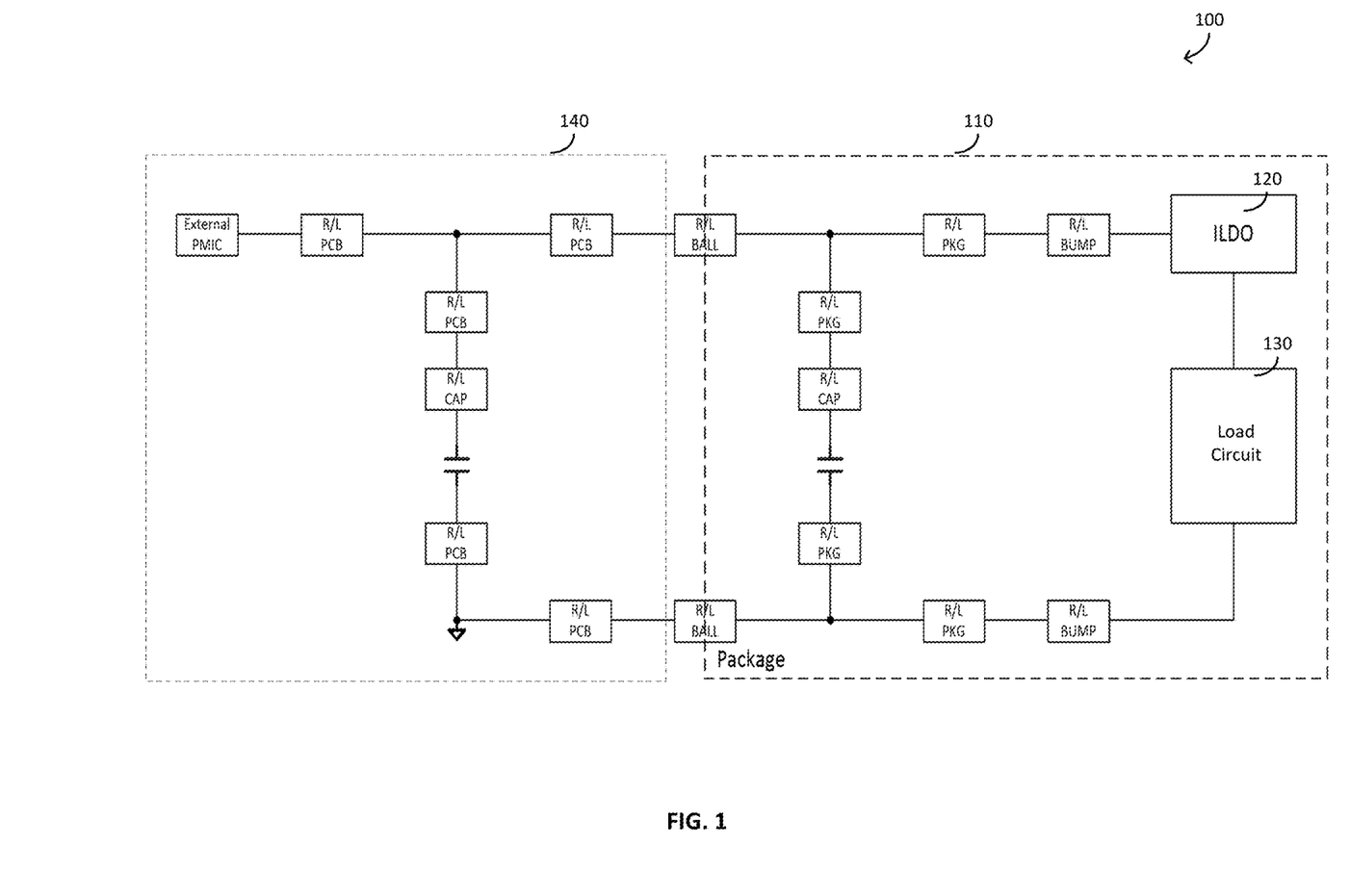
FIG. 1 shows a low dropout regulator and associated circuitry.

Prior to discussing such control systems, the presence of parasitics in circuitry associated with an ILDO regulator will be discussed. FIG. 1 shows a circuit board 100 including package components 110 and off-package components 140. The package components 110 may comprise an integrated low dropout (ILDO) regulator 120 coupled to a load circuit 130. The ILDO regulator 120 may provide its output to the load circuit 130. The off-package components 140 may have parasitic inductances, capacitances, and/or resistances as well as an external power management integrated circuit (PMIC). For example, off-package inductors may have parasitic capacitance between the winding turns of the inductors. In another example, off-package capacitors may have parasitic resistance at various frequencies. Additionally, the package components 110 may have parasitic inductance, capacitance, and/or resistance through similar mechanisms, as well as couplings between the package and non-package components. Any or all of the parasitic effects described herein may vary over time. Additionally, the impedance of the load circuit 130 may vary over time. For example, if the load circuit 130 is coupled to another circuit, the reflected impedance from the coupling may change over time, changing the impedance of the load circuit 130 seen by the ILDO regulator 120. In another example, the impedance of the load circuit 130 may vary due to time-varying parasitic effects within the load circuit 130. In some embodiments, the ILDO regulator 120 may be designed to provide a power, voltage, or current output to the load circuit 130 in a way that mitigates the parasitic effects and the variance in load impedance. It should be appreciated that the off-package components 140 shown in FIG. 1 are merely an example, and in some embodiments no off-package components may be used. In some embodiments, no on-chip package components may be used other than the ILDO regulator 120 and the load circuit 130.

The load circuit 130 may be any circuit receiving power, current, or voltage from the ILDO regulator 120. The impedance of the load circuit 130 may vary over time due to a number of effects, such as a variation in the size of the load or the variation in parasitics. Accordingly, in some embodiments the ILDO regulator 120 may adapt to the variations in the impedance of the load circuit as well as the parasitics of the package components 110 and off-package components 140, as will be described in further detail below.

Figure 2A:
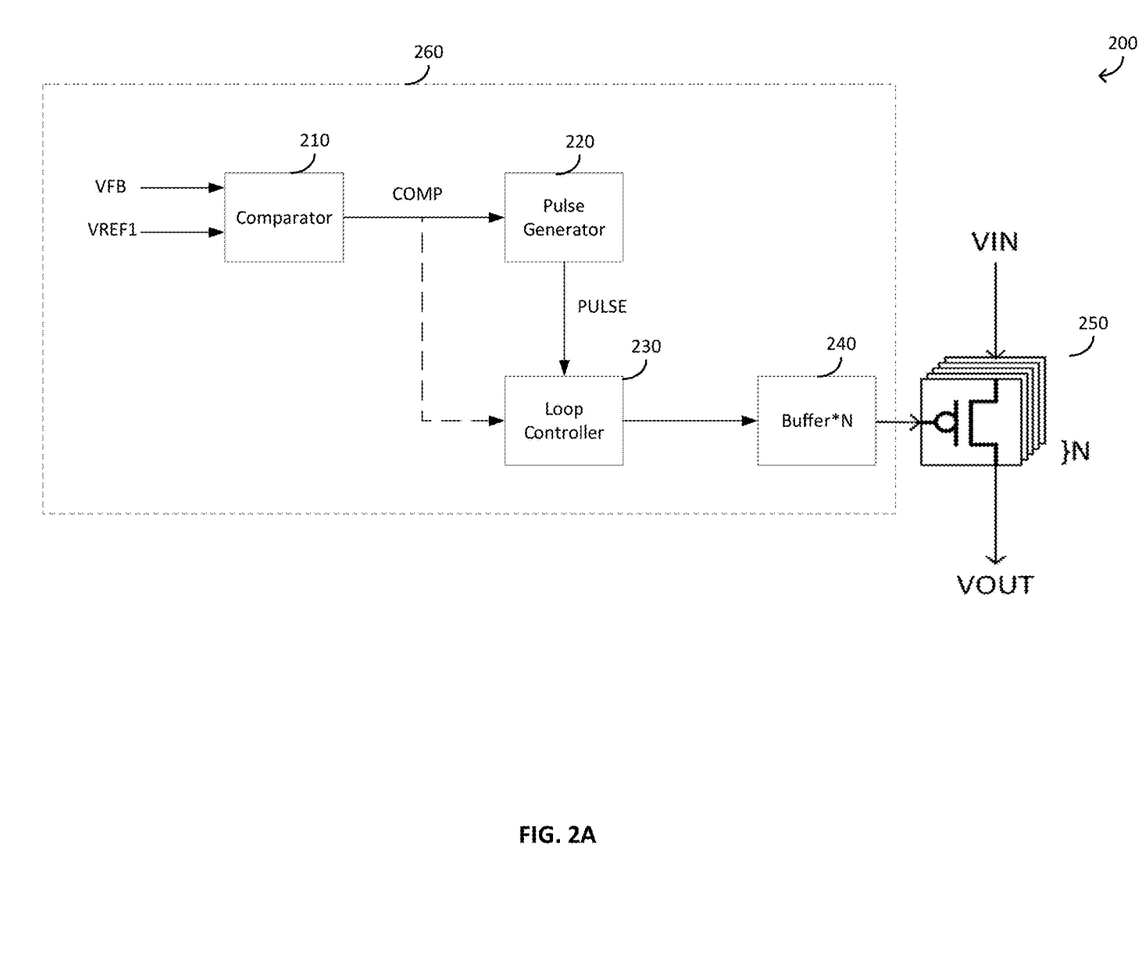
FIG. 2A shows an embodiment of a low dropout regulator with a single control branch.

FIG. 2A shows an embodiment of an ILDO regulator 200. The ILDO regulator 200 may comprise a control circuit 260 and a switch circuit 250. The control circuit 260 may receive a feedback signal VFB and a reference signal VREF1 at the comparator 210. VFB may be a signal indicating a voltage level at the output of the ILDO regulator 200. For example, VFB may be the output voltage of the ILDO regulator 200 in some embodiments. In other embodiments, VFB may be a scaled representation of the output voltage of the ILDO regulator 200. In other embodiments, the feedback signal provided to the comparator 210 may be representative of a current or power provided to the load circuit. VREF1 may be a reference voltage, which may be preset in a memory of the system, set by a user of the system, or established through any suitable means. In other embodiments, the reference signal may be a reference current or power. The comparator 210 may compare the feedback and reference signals and output a COMP signal indicating a change of state between the two signals. For example, if VFB is initially lower than VREF1 and then becomes higher than VREF1, comparator 210 may generate a first COMP signal indicative of the change of state of VFB. Alternatively, if VFB is initially higher than VREF1 and then becomes lower than VREF1, comparator 210 may generate a second COMP signal, indicative of the change of state of VFB, different from the first COMP signal. For example, the first COMP signal may be a pulse with a first shape, duration and/or magnitude, and the second COMP signal may be a pulse with a second shape, duration and/or magnitude. In some embodiments, the first COMP signal and second COMP signal may be different and may indicate the which state VFB is in relative to VREF1 (e.g., VFB fell below VREF1 or VFB rose above VREF1). While the examples given herein are in terms of voltage comparison, it should be appreciated that current or power could be compared instead of voltage. The change in level of VFB relative to VREF1 may be used to determine a change a level of the output voltage provided by the ILDO regulator 200 to the load circuit. Accordingly, the ILDO regulator 200 may adjust its output voltage to compensate for the change in level of VFB relative to VREF1.

The output COMP of the comparator 210 may be sent to the pulse generator 220. The output COMP may cause the pulse generator 220 to generate a pulse, which may be sent to the loop controller 230. The pulse generator 220 may be any circuit suitable for generating a signal representative of the state change detected by the comparator 210. In some embodiments, the pulse generator 220 may generate a first pulse type if the output COMP of the comparator 210 indicates that VFB has changed state to be above VREF1 and may generate a second pulse type if the output COMP of the comparator 210 indicates that VFB has changed state to be below VREF1. In some embodiments, the pulse generator 220 may generate the same pulse for any change of state detected by the comparator 210. In such embodiments, the comparator 210 may be connected to the loop controller 230 as well as the pulse generator 220, so that when the loop controller 230 receives a pulse from the pulse generator 220, it may receive the COMP signal produced by the comparator 210 to indicate the level of VFB relative to VREF1. It should be appreciated that in some embodiments no pulse generator 220 may be used, and the output of the comparator 210 may be passed to the loop controller 230. In such embodiments, a level of the COMP signal may indicate the level of VFB relative to VREF1, and the loop controller 230 may respond to the change in state of the COMP signal by using the level of the COMP signal to make a determination of a number of switches in the switch circuit 250 to enable or disable, as will be explained in further detail below.

The loop controller 230 may receive the signal PULSE from the pulse generator 220 and/or the signal COMP from the comparator 210, and make a determination of a number of switches in the switch circuit 250 to enable or disable. In some embodiments where the loop controller 230 receives just the signal PULSE from the pulse generator 220, the signal PULSE may correspond to the state of the output COMP of the comparator 210. PULSE may correspond to a first pulse shape, magnitude and/or duration when COMP is at a first level and may correspond to a second pulse shape, magnitude and/or duration when COMP is at a second level. In some embodiments where the loop controller receives both the signal PULSE and the output COMP, PULSE may be the same pulse shape regardless of the level of COMP, and the loop controller 230 may adjust the number of enabled switches in the switch circuit 250 based on the level of COMP when the signal PULSE is received. In some embodiments where the loop controller 230 receives COMP and not PULSE, the loop controller 230 may adjust the number of enabled switches in the switch circuit 250 when the signal COMP changes levels. The number of enabled switches in the switch circuit 250 may correspond to the level of the output voltage VOUT of the ILDO regulator 200. For example, if the loop controller 230 receives an indication that the feedback voltage VFB is low relative to VREF1, the loop controller 230 may generate a signal to enable more switches in the switch circuit 250 than are currently enabled, so as to increase the output voltage of the ILDO regulator 200. In such an example, if there are currently five switches enabled in the switch circuit 250, and the loop controller 230 receives and indication that VFB is low relative to VREF1, the loop controller 230 may generate a signal to enable a sixth switch in the switch circuit 250. Alternatively, the loop controller 230 may receive an indication of the magnitude of the difference between VFB and VREF1 and may enable a proportional number of switches in the switch circuit 250. In another example, if the loop controller 230 receives an indication that the feedback voltage VFB is high relative to VREF1, the loop controller 230 may generate a signal to disable additional switches in the switch circuit 250, so as to decrease the output voltage of the ILDO regulator 200. In FIG. 2A, N switches are shown in the switch circuit 250, where N is any positive integer greater than one. The loop controller 230 may be any controller suitable for determining a number of switches in the switch circuit 250 to enable and generating a signal to enable the switches, such as a field programmable gate array (FPGA), a microprocessor, or a hardware logic circuit.

The signal from the loop controller 230 may be passed through the optional buffer circuit 240 before reaching the switch circuit 250. The buffer circuit 240 may include N buffer amplifiers, with each buffer amplifier connected from the loop controller 230 to a corresponding switch of the switch circuit 250. Thus, each buffer amplifier of the buffer circuit 240 may provide a separate signal path between the loop controller 230 to each switch of the switch circuit 250. The buffer circuit 240 may adjust the impedance level seen by the output of the loop controller 230 and the input of the switch circuit 250, to drive the switches of the switching circuit 250.

The switch circuit 250 may include N switches, controlled by the loop controller 230, providing a conduction path between a high reference voltage VIN and the output VOUT of the ILDO regulator 200. The high reference voltage VIN may be provided through any known voltage source, such as a power supply or a battery. The output VOUT of the ILDO regulator 200 may be connected to the load circuit as shown in FIG. 1.

Figure 2B:
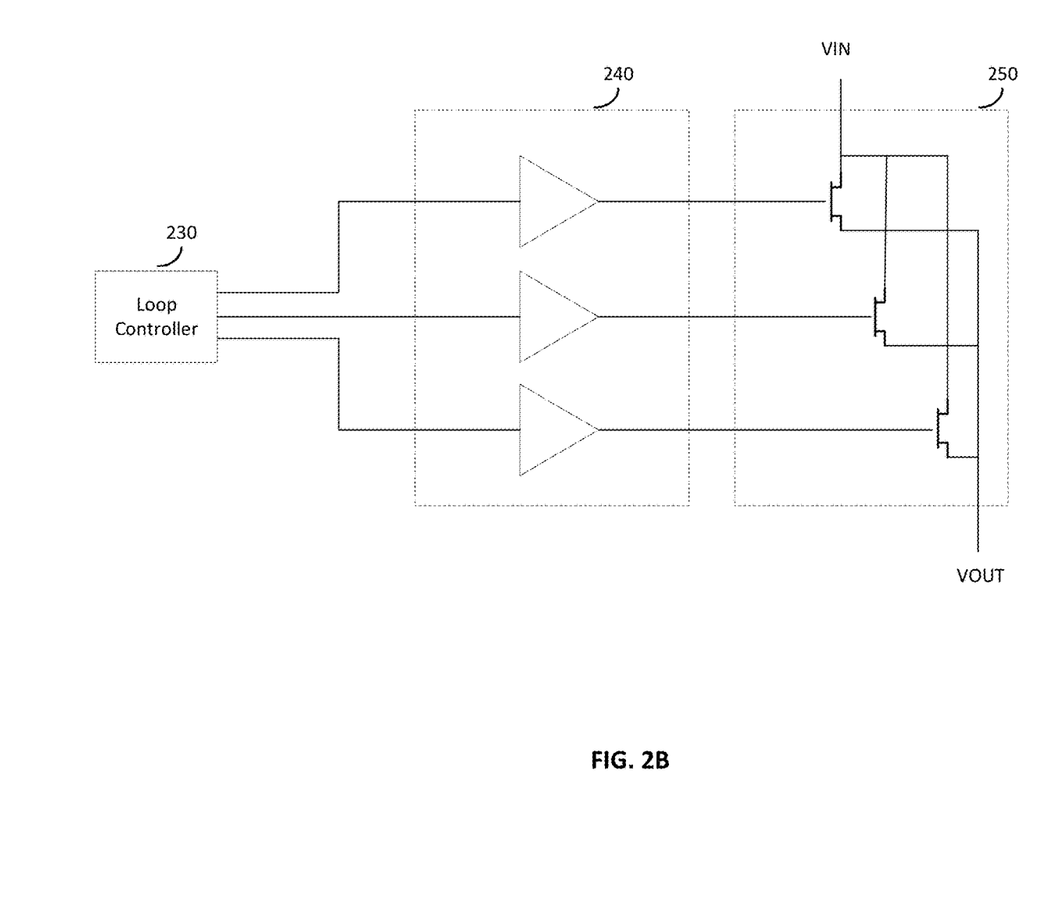
FIG. 2B shows an embodiment of a buffer circuit and switch circuit of a low dropout regulator.

FIG. 2B shows an example of the buffer circuit 240 and the switch circuit 250. In this example, N may be equal to 3, though any positive integer greater than or equal to 2 may be used. The loop controller 230 provides three output signals, one for each of the switches in the switch circuit 250. The output signals from the loop controller 230 may go through buffer amplifiers in the buffer circuit 240, before being connected to the control terminals (e.g., gates) of switches in the switch circuit 250. The switches in the switch circuit 250 may be connected in parallel, such that turning on more switches produces a higher output voltage or current at VOUT, and turning off more switches produces a lower output voltage or current at VOUT. It should be appreciated that the configuration of buffer amplifiers and switch connections shown is merely one example, and any suitable implementation that allows for the control by the loop controller 230 of switches within the switch circuit 250 may be used.

Figure 3:
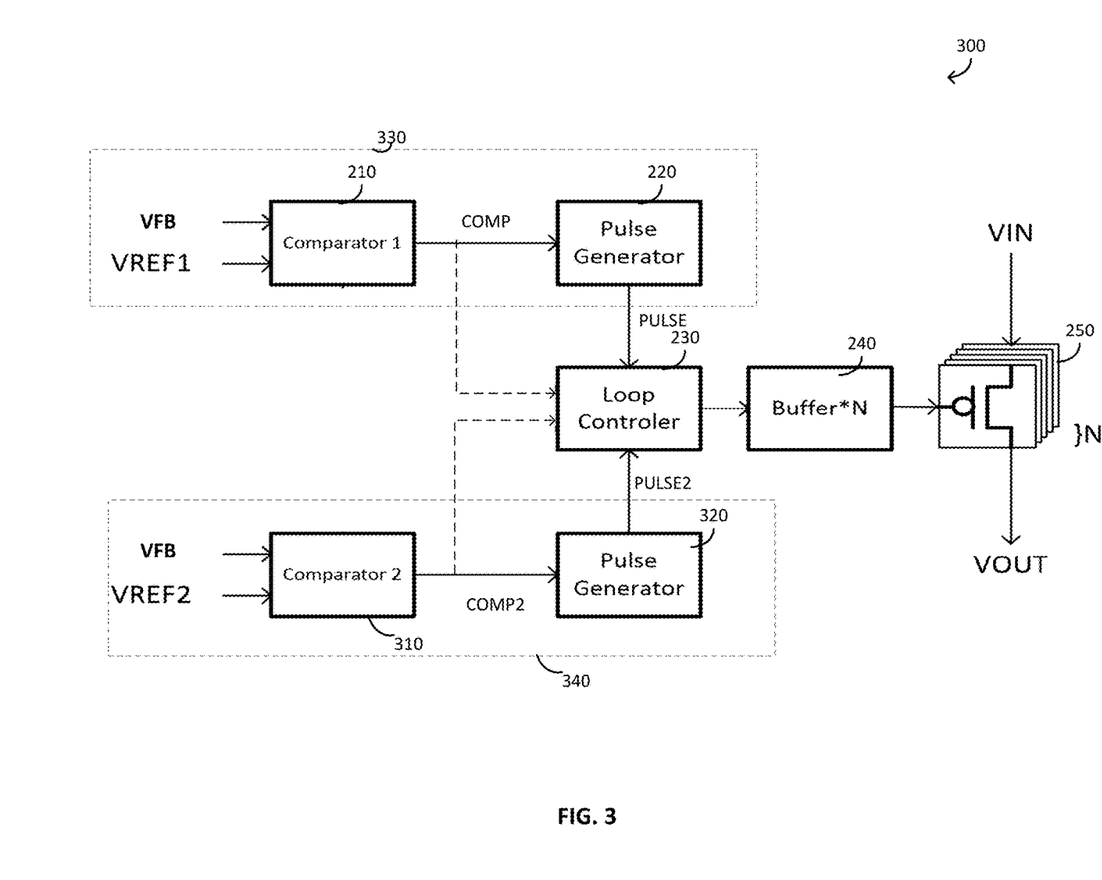
FIG. 3 shows an embodiment of a low dropout regulator with two control branches.

In some embodiments, it may be desirable to provide multiple reference voltages, such that the loop controller may adjust the output voltage relative to the multiple reference voltages. Such embodiments may allow the output voltage to be kept within a range determined by the multiple reference voltage levels, or within multiple ranges determined by the multiple reference voltage levels. FIG. 3 shows another embodiment of an ILDO regulator 300 comprising a first branch 330 and a second branch 340. The second branch 340 of the ILDO regulator 300 may comprise a second comparator 310 and a second pulse generator 320. The second comparator 310 may receive as inputs the feedback voltage VFB as well as a second reference voltage VREF2. VREF2 may be the same reference voltage or a different reference voltage as VREF1. The comparator 310 may compare the VFB and VREF2 signals and indicate a change of state between the two signals through the signal COMP2. For example, if VFB is initially lower than VREF2 and then becomes higher than VREF2, comparator 310 may generate a signal COMP2 indicative of the change of state. Alternatively, if VFB is initially higher than VREF2 and then becomes lower than VREF2, comparator 310 may generate a signal COMP2 indicative of the change of state. The output COMP2 of the comparator 310 may go to the pulse generator 320 or the loop controller 230.

The change in state detected and outputted by the comparator 310 may cause the pulse generator 320 to generate a pulse PULSE2, which may be sent to the loop controller 230. The pulse generator 320 may be any circuit suitable for generating a signal representative of the state change detected by the comparator 310. In some embodiments, the pulse generator 320 may generate a first pulse type if the comparator 310 detects that VFB has changed state to be above VREF2 and may generate a second pulse type if the comparator 310 detects that VFB has changed state to be below VREF2. In some embodiments, the pulse generator 320 may generate a pulse or signal PULSE2 periodically unless the comparator 310 detects a change in state of VFB relative to VREF2. In some embodiments, the pulse generator 320 may generate the same pulse for any change of state detected by the comparator 310. It should be appreciated that in some embodiments no pulse generator 320 may be used, and the output COMP2 of the comparator 310 may be passed to the loop controller 230. In some embodiments, the pulse generator 320 may be used and the output COMP2 of the comparator 310 may be passed to the loop controller 230 as well. In such an embodiment, the loop controller 230 may use the outputs of the comparators 210 and 310 in conjunction with the outputs of the pulse generators 220 and 320 to determine the priorities of the controllers if two state changes are detected. For example, if VFB begins below VREF1 and VREF2 but then rises rapidly to exceed both VREF1 and VREF2, with VREF2>VREF1 in this example, the loop controller 230 may determine that it should handle the event generated by the second branch 340, that is the second comparator 310 and the second pulse generator 320, since handling the event on the second branch 340 will inherently satisfy the event on the first branch 330 due to the relationship between the two reference voltages.

While two branches 330 and 340 are shown in FIG. 3, a branch being a signal chain receiving a signal indicative of the output voltage, a threshold, and generating an event detection signal that is sent to the loop controller 230, it should be appreciated that any number of branches may be used. The signal indicative of the output voltage may be a voltage or current signal, with or without scaling. For example three branches with three thresholds may be used, or four branches with four thresholds may be used. Additionally, a single branch may use multiple thresholds if a suitable comparator is used. It should be appreciated that in some embodiments, a single comparator may be used with two thresholds VREF1 and VREF2, rather than two comparators. The output of the comparator may be a tristate signal indicating the level of VFB relative to the two references or the comparator may have two outputs, each output indicating the level of VFB relative to one of the two references.

The ILDO regulator 300 with two branches may be used to monitor the output voltage VOUT and keep it within predetermined bounds. For example, VREF1 may be set to be a lower bound voltage, and VREF2 may be set to be an upper bound voltage. If VOUT, which is intended to be between VREF1 and VREF2 during operation of the system, increases due to various parasitic or loading effects, such that VFB exceeds the upper bound voltage VREF2, the comparator 310 will trigger an event, and send a signal indicating the change of state to the loop controller 230 and/or the pulse generator 320. If the comparator 310 sends a signal to the pulse generator 320, the pulse generator 320 will subsequently generate and send a pulse to the loop controller 230 corresponding to the change of state of the comparator 310. The loop controller 230 will subsequently decrease the number of active switches in the switch circuit 250 to lower the output voltage VOUT. The number of switches deactivated may be a fixed amount (e.g., the loop controller disables one additional switch for each event) or may be a proportional amount (e.g., the loop controller disables a number of switches proportional to how much larger VOUT is than the reference voltage). If VOUT decreases due to various parasitic or loading effects such that VFB falls under the lower bound voltage VREF1, the comparator 210 will trigger an event, and send a signal indicating the change of state to the loop controller 230 and/or the pulse generator 220. If the comparator 210 sends a signal to the pulse generator 220, the pulse generator 220 will subsequently generate and send a pulse to the loop controller 230 corresponding to the change of state of the comparator 210. The loop controller 230 will subsequently increase the number of active switches in the switch circuit 250 to increase the output voltage VOUT. The number of switches activated may be a fixed amount (e.g., the loop controller enables one additional switch for each event) or may be a proportional amount (e.g., the loop controller enables a number of switches proportional to how much smaller VOUT is than the reference voltage).

In some embodiments, it may be desirable to control the output voltage relative to a timing reference. If the output voltage stays at a fixed level for a time longer than a reference time, it may be desirable to adjust the output voltage level to provide fine control over the output voltage level. For example, if the desired output voltage level is 0.70V, and the output voltage level stays at 0.69V for longer than a predetermined amount of time, it may be desirable to increase the output voltage level even if the resulting level would be above 0.70V, so that the average output voltage over an extended period of time approaches 0.70V.

Figure 4:
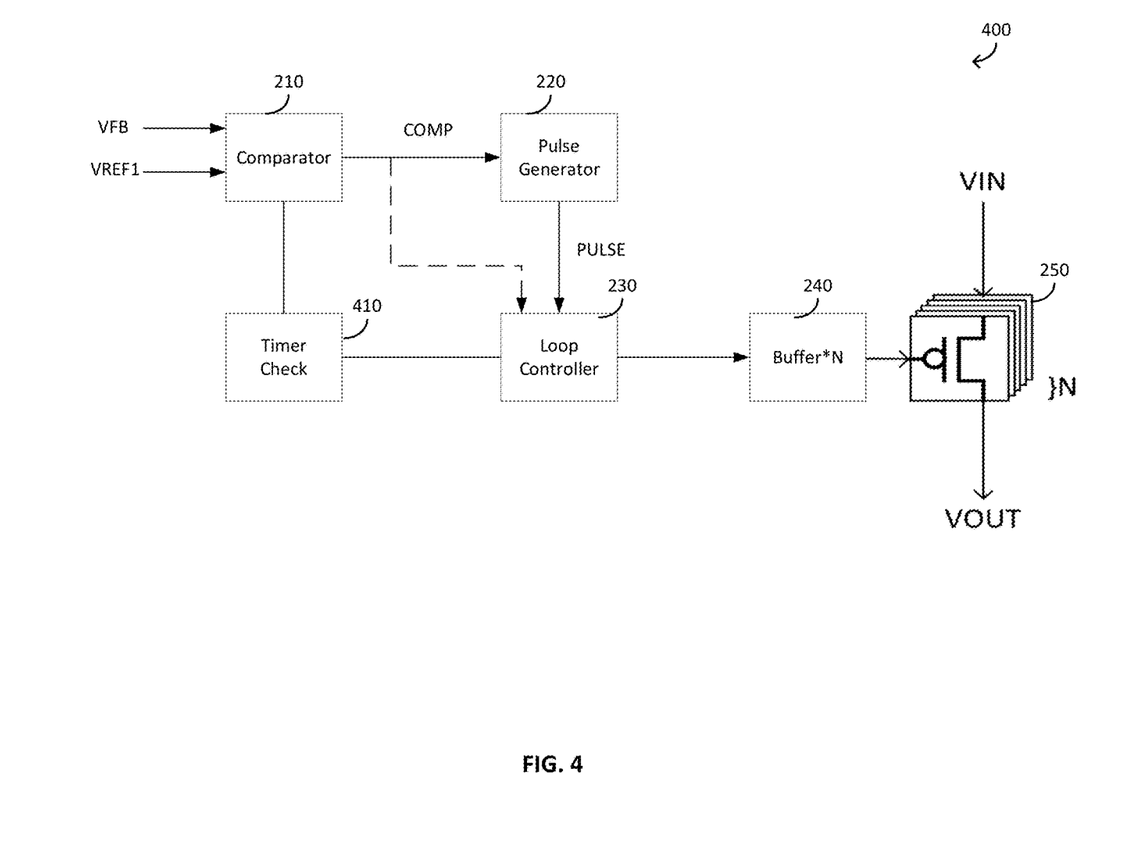
FIG. 4 shows an embodiment of a low dropout regulator with timer control.

FIG. 4 shows a single branch ILDO regulator 400 additionally comprising a timer check circuit 410. The timer check circuit 410 may comprise a time comparison circuit and a running timer. In some embodiments, the running timer may be separate from the timer check circuit 410 and the timer check circuit 410 may receive a timing signal from the running timer. When the comparator 210 detects an event based on the relative values of the feedback voltage VFB and the reference voltage VREF1, the comparator 210 may send a signal indicative of the event to the timer check circuit 410 and to at least one of the pulse generator 220 and the loop controller 230. The timer check circuit 410 may compare the value of a running timer at the time the event from the comparator 210 is received to a threshold time T1. The running timer may be any suitable time keeping circuit, such as an oscillator, a clock input, or a counter. The threshold time may be a preset time to regulate the action taken by the loop controller 230. Additionally, the timer check circuit 410 may also or alternatively receive the feedback voltage VFB from the comparator 210 or directly from the input to the ILDO regulator 400. In some embodiments, the timer check circuit may be used to prevent the output voltage VOUT from remaining at a single level for longer than a determined period of time. For example, it may be acceptable for the output voltage to be slightly above or slightly below the desired output voltage for a short period of time, but undesirable for the output voltage to remain at that level. Accordingly, if the timer check circuit 410 detects that VFB is at a constant undesired level for a time that exceeds the threshold T1, then the timer check circuit 410 may trigger the loop controller 230 to correspondingly adjust the number of active switches in the switch circuit 250, even though the comparator has not caused an event. The time based control may allow for finer control of the output voltage VOUT in the system by using the voltage level based comparison to make changes to the output voltage and then readjusting the voltage level over time based on the timer control.

Figure 5:
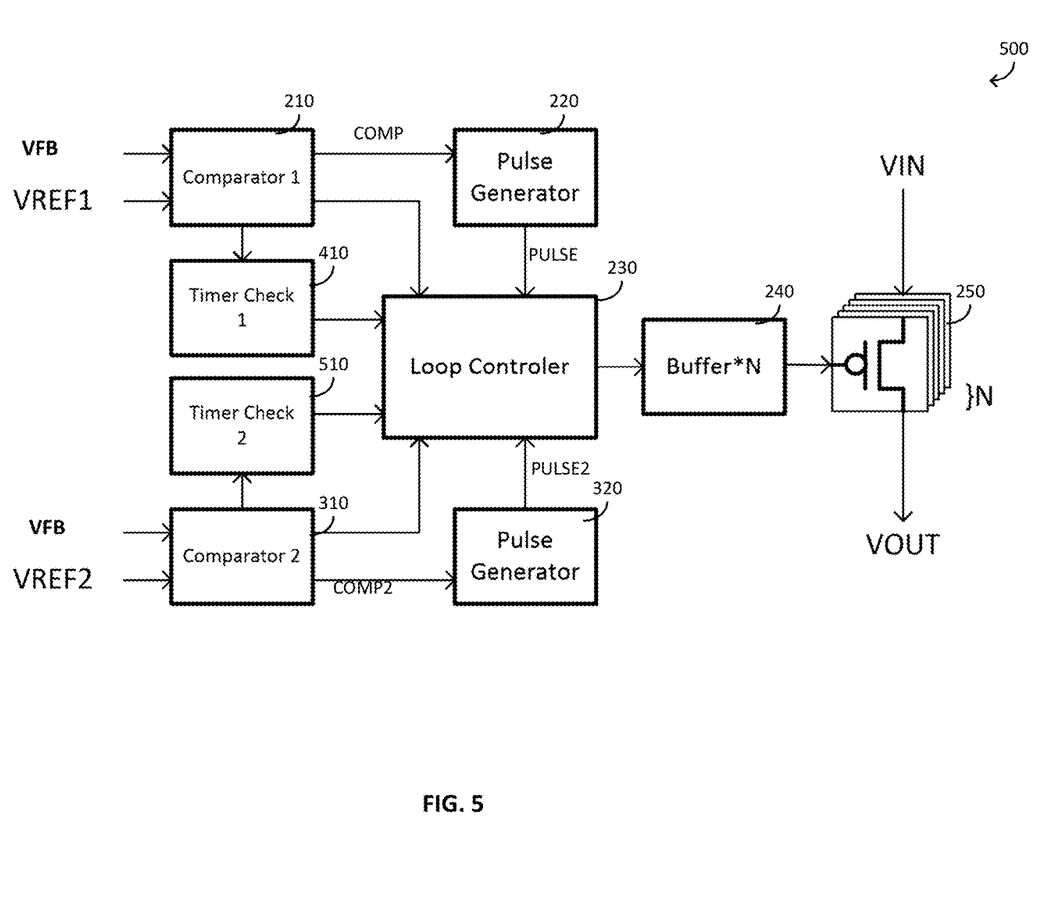
FIG. 5 shows another embodiment of a low dropout regulator with timer control.

FIG. 5 shows a double branch ILDO regulator 500, with each branch having a timer check circuit. When the comparator 310 detects an event based on the relative values of the feedback voltage VFB and the reference voltage VREF2, the comparator may send a signal indicative of the event to the timer check circuit 510 and to at least one of the pulse generator 320 and the loop controller 230. The timer check circuit 510 may compare the value of a running timer at the time the event from the comparator 310 is received to a threshold time T2. The running timer may be any suitable time keeping mechanism, such as an oscillator, a clock input, or a counter. The threshold time may be a preset time to regulate the action taken by the loop controller 230, as described above. Additionally, the timer check circuit 510 may also or alternatively receive the feedback voltage VFB from the comparator 310 or directly from the input to the ILDO regulator 500. However, with multiple timer check circuits intervals may be set to regulate the action taken by the loop controller 230. For example, if T1 is less than T2, then in the case that the running timer reaches T1 with VOUT at an undesirable level, the loop controller 230 may set the number of active switches in a first configuration. If the running timer reaches a time between T1 and T2 with VOUT at an undesirable level, the loop controller 230 may set the number of active switches in a second configuration. While two separate timer check circuits 410 and 510 are shown in FIG. 5, it should be appreciated that the two timer check circuits could be implemented as a single time with multiple inputs and thresholds. Additionally, it should be appreciated that while two branches are shown in FIG. 5, any number of branches and timer check circuits may be used to provide finer control of the output voltage VOUT.

In some embodiments the load circuit at the output of the ILDO regulator may comprise a mesh circuit. In such instances, the providing the output of the ILDO regulator to one end of the mesh circuit may cause an uneven power, voltage, or current distribution across the load circuit. Described herein is a system with multiple ILDO regulators to provide power, voltage, or current at multiple points across the load circuit, wherein the ILDO regulators can communicate to maintain the stability of the system or otherwise improve control of the system.

Figure 6:
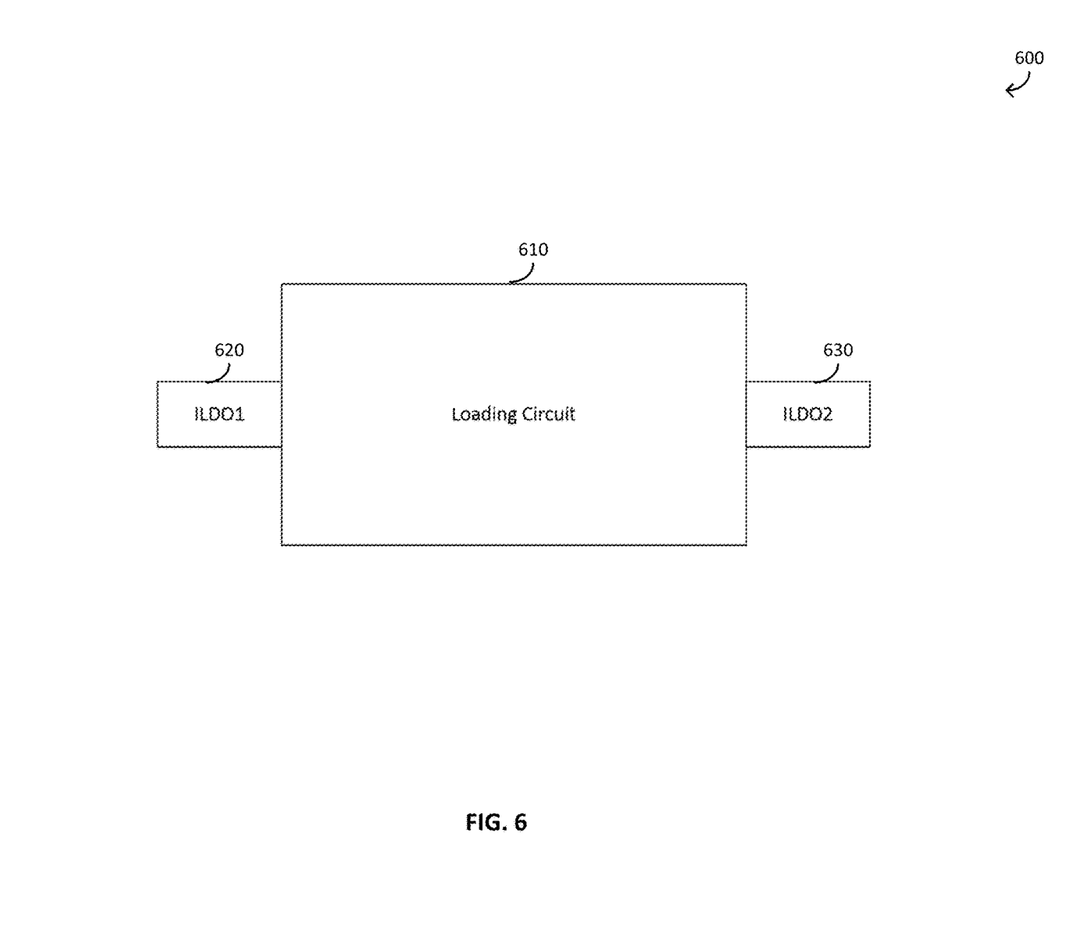
FIG. 6 shows an embodiment of two low dropout regulators across a load circuit.

FIG. 6 shows a system 600 comprising a first ILDO regulator 620 and a second ILDO regulator 630 coupled across a load circuit 610. In embodiments where the load circuit 610 is equivalent to a resistive mesh, if a single ILDO regulator is used and connected to one side of the load circuit 610, the mesh may cause the voltage from the ILDO regulator to be unevenly dissipated across the load circuit 610, resulting in inefficient operation and high power loss. Accordingly, the system 600 uses a first ILDO regulator 620 on a first side of the load circuit 610 and a second ILDO regulator 630 on a second side of the load circuit 610. By providing equal voltage on separate sides of the load circuit 610, the voltage dissipation across the mesh may be reduced, and a more even power consumption may be achieved. However, if the first ILDO regulator 620 and the second ILDO regulator 630 provide voltage to the mesh independently, the output voltages may dampen each other if they are not adjusted in a synchronous manner.

Figure 7:
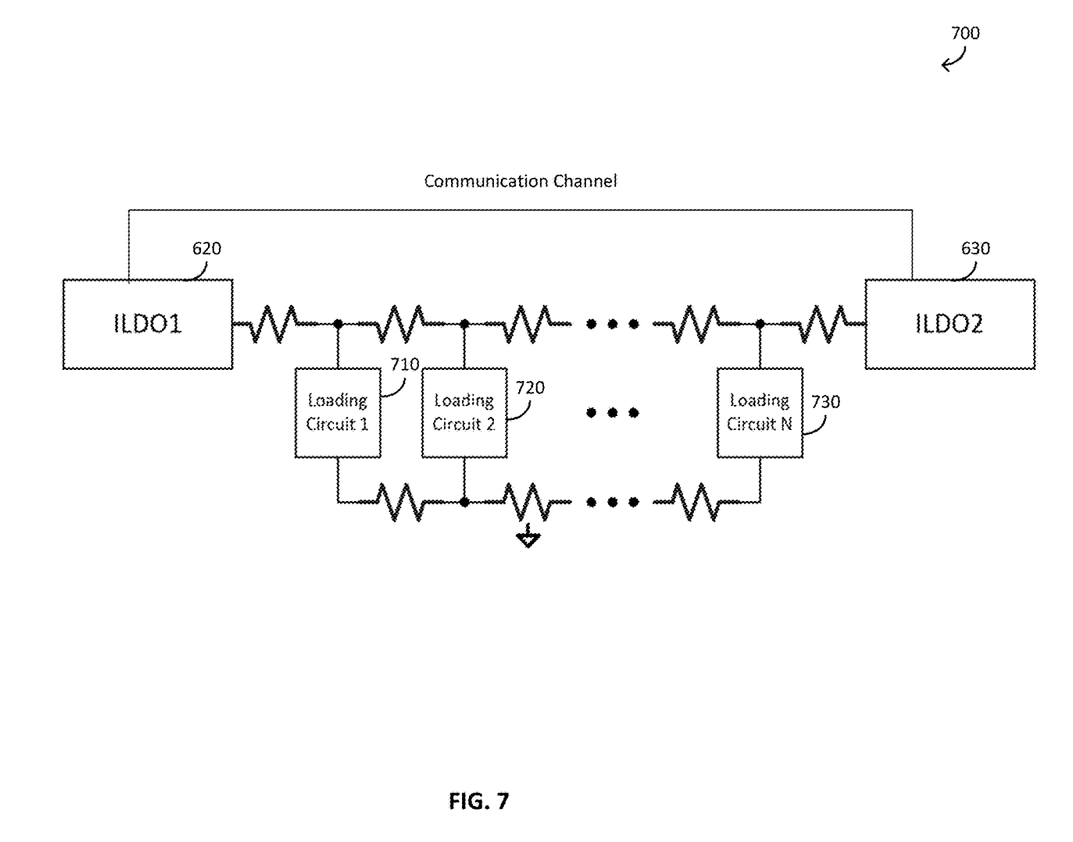
FIG. 7 shows another embodiment of two low dropout regulators across a load circuit.

FIG. 7 shows a system 700 with the first and second ILDOs 620 and 630 coupled across the load circuit 610. The load circuit 610 comprises N (unrelated to the number of switches in the ILDO switching circuit) sub-circuits arranged in a mesh network, with N being a positive integer greater than or equal to one. Each of the sub-circuits 710, 720, and 730 may act as a sub-circuit within the load circuit 610 coupled to the first and second ILDOs 620 and 630, but the resistances between each of the sub-circuits 710, 720, and 730 may cause uneven power to be dissipated across them if the first ILDO regulator 620 and the second ILDO regulator 630 operate independently. Accordingly, the first ILDO regulator 620 and the second ILDO regulator 630 may exchange control signals over a communication channel. For example, in a unilateral embodiment, the loop controller of the first ILDO regulator 620 may receive signals from the comparator, pulse generator, and/or the timer check circuit of the second ILDO regulator 630. Thus, if the second ILDO regulator 630 detects an event on the second side of the load circuit 610 that does not occur on the first side of the load circuit 610, the first ILDO regulator 620 may be notified and the loop controller of the first ILDO regulator 620 may change the number of active switches to adjust the output voltage of the first ILDO regulator 620 and prevent a damping effect from occurring through uneven voltage applied to the load circuit 610. In another bidirectional embodiment, both ILDOs 620 and 630 may communicate event information to each other based on their timer check circuit, pulse generator, and/or comparators signals to maintain synchronized voltage output to the load circuit 610. While two ILDOs are shown in FIGS. 6 and 7, it should be appreciated that any number of ILDOs may be applied to the load circuit and synchronized.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A low dropout regulator that produces an output, comprising:
   a comparison circuit, configured to compare a signal representative of the output and a reference signal to produce a comparison result;
   a loop controller, coupled to the comparison circuit, configured to generate an output circuit control signal based at least in part on the comparison result;
   an output circuit, comprising two or more output stages, configured to adjust a number of active output stages of the two or more output stages based on the output circuit control signal; and
   two or more buffer amplifiers, coupled between the loop controller and the output circuit.

2. The low dropout regulator of claim 1, wherein the comparison circuit is coupled to the loop controller through a pulse generator, the pulse generator being configured to generate a pulse in response to a change in the comparison result.

3. The low dropout regulator of claim 1, wherein the loop controller is configured to enable at least one output stage of the two or more output stages when the output is less than the reference signal.

4. The low dropout regulator of claim 1, wherein the loop controller is configured to disable at least one output stage of the two or more output stages when the output is greater than the reference signal.

5. The low dropout regulator of claim 1, further comprising a timer check circuit, configured to compare a running time to a first reference time to produce a time check signal.

6. The low dropout regulator of claim 5, wherein the loop controller is further configured to generate the output circuit control signal based on the time check signal.

7. The low dropout regulator of claim 5, wherein the time check signal is generated when the running time exceeds the first reference time.

8. The low dropout regulator of claim 5, wherein the running time begins when the output circuit adjusts the number of active output stages.

9. The low dropout regulator of claim 5, wherein the running time begins when a previous comparison result changed state.

10. A low dropout regulator that produces an output, comprising:
- a comparison circuit, configured to compare a signal representative of the output and a reference signal to produce a comparison result;
- a loop controller, coupled to the comparison circuit, configured to generate an output circuit control signal based at least in part on the comparison result; and
- an output circuit, comprising two or more output stages, configured to adjust a number of active output stages of the two or more output stages based on the output circuit control signal,
- wherein the comparison circuit is coupled to the loop controller through a pulse generator, the pulse generator being configured to generate a pulse in response to a change in the comparison result,
- wherein the pulse generator is configured to generate a first type of pulse if the output is greater than the reference signal and a second type of pulse if the output is less than the reference signal.

11. The low dropout regulator of claim 10, wherein the loop controller is configured to generate the output circuit control signal based on the pulse.

12. The low dropout regulator of claim 10, wherein the loop controller is configured to enable at least one output stage of the two or more output stages when the output is less than the reference signal.

13. The low dropout regulator of claim 10, wherein the loop controller is configured to disable at least one output stage of the two or more output stages when the output is greater than the reference signal.

14. The low dropout regulator of claim 10, further comprising a timer check circuit, configured to compare a running time to a first reference time to produce a time check signal.

15. The low dropout regulator of claim 14, wherein the loop controller is further configured to generate the output circuit control signal based on the time check signal.

16. A low dropout regulator that produces an output, comprising:
- a comparison circuit, configured to compare a signal representative of the output and a reference signal to produce a comparison result;
- a loop controller, coupled to the comparison circuit, configured to generate an output circuit control signal based at least in part on the comparison result;
- an output circuit, comprising two or more output stages, configured to adjust a number of active output stages of the two or more output stages based on the output circuit control signal; and
- a second comparison circuit, configured to compare a signal representative of the output and a second reference signal to produce a second comparison result,
- wherein the loop controller is further coupled to the second comparison circuit and is configured to generate the output circuit control signal based at least in part on the comparison result and the second comparison result.

17. The low dropout regulator of claim 16, further comprising:
- a pulse generator, coupled between the second comparison circuit and the loop controller, configured to generate a pulse in response to a change in the second comparison result.

18. A system, comprising:
- a load circuit comprising a plurality of sub-circuits;
- a first low dropout regulator coupled to a first terminal of the load circuit, configured to provide a first output of the first low dropout regulator to the first terminal; and
- a second low dropout regulator coupled to a second terminal of the load circuit, configured to provide a second output of the second low dropout regulator to the second terminal,
- wherein the first low dropout regulator is configured to send a first indication of a change of level of the first output to the second low dropout regulator, and
- wherein the second low dropout regulator is configured to provide the second output based on the first indication.

19. A system, comprising:
- a load circuit comprising a plurality of sub-circuits;
- a first low dropout regulator coupled to a first terminal of the load circuit, configured to provide a first output of the first low dropout regulator to the first terminal; and
- a second low dropout regulator coupled to a second terminal of the load circuit, configured to provide a second output voltage of the second low dropout regulator to the second terminal,
- wherein the first low dropout regulator is configured to send a first indication of a change of level of the first output to the second low dropout regulator, and
- wherein the second low dropout regulator is configured to send a second indication of a change of level of the second output voltage to the first low dropout regulator.

20. The system of claim 19, wherein the first low dropout regulator is configured to provide the first output based on the second indication.

* * * * *